United States Patent
Boettner et al.

(10) Patent No.: US 10,007,064 B2
(45) Date of Patent: Jun. 26, 2018

(54) WAVEGUIDE RESONATOR COMPONENT AND METHOD FOR THE PRODUCTION THEREOF

(71) Applicant: LEIBNIZ-INSTITUT FUER FESTKOERPER-UND WERKSTOFFFORSCHUNG DRESDEN E.V, Dresden (DE)

(72) Inventors: Stefan Boettner, Dresden (DE); Oliver G. Schmidt, Dresden (DE)

(73) Assignee: LEIBNIZ-INSTITUT FUER FESTKOERPUR-UND WERKSTOFFFORSCHUNG DRESDEN E.V, Dresden (DE)

( * ) Notice: Subject to any disclaimer, the term of this patent is extended or adjusted under 35 U.S.C. 154(b) by 0 days. days.

(21) Appl. No.: 14/773,064

(22) PCT Filed: Mar. 13, 2014

(86) PCT No.: PCT/EP2014/055006
§ 371 (c)(1),
(2) Date: Sep. 4, 2015

(87) PCT Pub. No.: WO2014/140206
PCT Pub. Date: Sep. 18, 2014

(65) Prior Publication Data
US 2016/0011374 A1     Jan. 14, 2016

(30) Foreign Application Priority Data

Mar. 15, 2013  (DE) .......... 10 2013 204 606

(51) Int. Cl.
*G02B 6/293*  (2006.01)
*G02B 6/00*   (2006.01)
(Continued)

(52) U.S. Cl.
CPC .......... *G02B 6/29338* (2013.01); *G02B 6/00* (2013.01); *G02B 6/122* (2013.01); *G02B 6/136* (2013.01);
(Continued)

(58) Field of Classification Search
None
See application file for complete search history.

(56) References Cited

U.S. PATENT DOCUMENTS 6,891,997 B2 * 5/2005 Sercel ............... B23K 26/0823
                                                         385/15
2003/0118270 A1  6/2003 Miyano et al.
(Continued)

FOREIGN PATENT DOCUMENTS

DE    100 25 307 A1   11/2001

OTHER PUBLICATIONS

Michael Pöllinger et al., "All-optical signal processing at ultra-low powers in bottle microresonators using the Kerr effect", Optics Express, Aug. 16, 2010, pp. 17764-17775.
(Continued)

*Primary Examiner* — Chad H Smith
(74) *Attorney, Agent, or Firm* — Greenblum & Bernstein, P.L.C.

(57) ABSTRACT

A waveguide resonator component, which can be used, for example, in integrated circuits, in which a substrate having two waveguides is present and a microtube is present as resonator, wherein the resonator has a respective recess in the region of each waveguide in order to form an intermediate space between the waveguide and the resonator. The aim is additionally achieved by a method in which a sacrificial layer is applied to a substrate having two waveguides and at least a second layer is applied to the sacrificial layer, and thereafter the sacrificial layer is at least partially
(Continued)

removed and the resonator is produced in the form of a microtube by rolling up the second layer and possible additional layers.

15 Claims, 3 Drawing Sheets

(51) Int. Cl.
    *G02B 6/122*     (2006.01)
    *G02B 6/136*     (2006.01)
    *G02B 6/12*     (2006.01)

(52) U.S. Cl.
    CPC .............. *G02B 6/29389* (2013.01); *G02B 2006/12109* (2013.01)

(56) References Cited

U.S. PATENT DOCUMENTS

2005/0013529 A1    1/2005   Chiu et al.
2006/0239614 A1    10/2006   Montgomery et al.
2011/0163421 A1    7/2011   Mi

OTHER PUBLICATIONS

Stefan Böttner et al., "Sharp whispering-gallery modes in rolled-up vertical $SiO_2$ micorcavities with quality factors exceeding 5000", Optical Society of America, Dec. 15, 2012, pp. 5136-5138.

Zhaobing Tian et al., "Single rolled-up InGaAs/GaAs quantum dot microtubes integrated with silicon-on-insulator waveguides", Optic Express, Jun. 8, 2011, pp. 12164-12171.

Rajesh Kumar et al., "10-GHz Al-Optical Gate Based on a III-V/SOI Microdisk", IEEE Photonics Technology Letters, Jul. 1, 2010, pp. 981-983.

Lin Zhang et al., "Microring-based modulation and demodulation of DPSK signal", Optics Express, Aug. 28, 2007, pp. 11564-11569.

Office Action issued in Germany Counterpart Patent Appl. No. DE 102013204606.5, dated Oct. 28, 2013.

Office Action issued in World Intellectual Property Organization Counterpart Patent Appl. No. PCT/EP2014/055006, dated Jun. 17, 2014.

* cited by examiner

WAVEGUIDE RESONATOR COMPONENT AND METHOD FOR THE PRODUCTION THEREOF

CROSS-REFERENCE TO RELATED APPLICATIONS

The present application is a U.S. National Stage of International Application No. PCT/EP2014/055006, filed Mar. 13, 2014, which published as WO 2014/140206 A1 on Sep. 18, 2014, the disclosure of which is expressly incorporated by reference herein in its entirety. Further, this application claims priority under 35 U.S.C. § 119 and § 365 of German Application No. 10 2013 204 606.5, filed Mar. 15, 2013.

FIELD OF THE DISCLOSURE

The present disclosure pertains to the fields of electrical engineering/electronics and communication technology and relates to a waveguide resonator component which can be used, for example, in integrated circuits and in data processing and transfer or as a sensor, and to a method for the production of this type of waveguide resonator component.

BACKGROUND OF THE DISCLOSURE

In optical circuits, signals can be transported in the form of light at different frequencies via light conductors, referred to as waveguides. Here, waveguides are coupled, for example, to resonators, in order to filter out certain discrete signals, frequencies or frequency ranges from the waveguides, for instance. In a very general sense, these filters have the task of limiting and/or transforming a wide spectrum of frequencies present at their inlet and supplying them at their outlet. By coupling a second waveguide to the resonator, the frequencies filtered out of the first waveguide can be diverted to the second waveguide. Thus, with the aid of the resonator, signals are removed from the first waveguide in a targeted manner and transmitted into the second waveguide (drop filter). As a result of the coupling of a second waveguide to the resonator, it is also possible to add additional signals from the second waveguide to the signals already present in the first waveguide (add-drop filter). The role of the waveguides is thereby interchangeable.

One important quality criterion of a filter is how effectively a desired frequency range (width of the resonance) can be transmitted exclusively. It is also important that a filter is available which, in the most accurate manner possible, blocks only those frequencies which lie outside the desired range and which allows the frequencies within the desired range to pass virtually unhindered, that is, losslessly.

A frequently used physical principle for implementing filters involves the utilization of a resonant frequency; accordingly, these types of filters are called resonant filters. These filters use, for example, ring resonators or microsphere resonators, which can also be used as sensors.

What are referred to as ring resonant filters or ring resonators are used for the requirement of mass production. The structures of ring resonant filters of this type are thereby produced from silicon wafers (SIO—silicon on insulator) by etching, for example. This etching can occur in a wet-chemical process or using dry-etching methods (reactive ion etching). With suitable etching processes, waveguides and ring resonators can also lie on different planes, or by the etching of multiple individual wafers that are placed on top of one another and, with respect to the resonators and waveguides, precisely positioned relative to one another and permanently connected to one another.

From DE 100 25 307 A1, an optical grid-assisted add/drop filter is known which comprises a structure of a directional coupler filter having at least two waveguides extending in a closely adjacent manner with different refractive indices. Here, the material of the two waveguides is formed from two different material classes with different optical parameters, wherein different properties of the two materials differ such that different effects occur when they are acted on by the same technical means, and wherein the optical parameters may be altered.

From US 2003/0118270 A1, an optical waveguide coupler is known in which a waveguide is directly coupled to a microsphere resonator under resonance conditions or under non-resonance conditions.

Also, from US 2006/0239614 A1, an optical microresonator coupled to waveguides is known which is composed of a plurality of microcylinders coupled to one another, and each microcylinder contains one resonant waveguide.

From US 2005/0013529 A1, a microring resonator and a method for the manufacture of such a resonator are known. A plurality of microring resonators are produced in that precursor resonator structures are brought into a specific position relative to waveguides and transformed into resonators.

Furthermore, according to M. Pöllinger et al.: Optics Express Vol. 18, (2010) 17764, bottle-like microresonators are known which utilize the Kerr effect, in which two conical waveguides are coupled with the bottle-like microresonator.

Additionally, according to S. Böttner et al.: Optics Letters, Vol. 37, (2012) 5136, rolled microstructures are known for the frequency-selective coupling of two layer stacks on one chip.

Disadvantageous according to the prior art is the costly and time-intensive production of the microresonators, in particular for vertically aligned microresonators, as well as their not yet adequately controllable coupling to waveguides.

SUMMARY OF EMBODIMENTS OF THE DISCLOSURE

The aim of the embodiments of the present disclosure is to provide a waveguide resonator component in which the coupling of the resonator to waveguides can be suitably controlled, as well as to specify a method with which these waveguide resonator components can be produced in a simple and cost-effective manner.

The aim is attained by the embodiments of the present disclosure disclosed in the claims. Advantageous embodiments are the subject matter of the dependent claims.

In the waveguide resonator component according to the embodiments of the present disclosure, at least one substrate comprises at least two waveguides, or at least two substrates comprise at least one waveguide each, and at least one microtube is present as a resonator, which microtube comprises, directly or via one or multiple layers, a partial materially-bonded contact with the substrate(s), wherein the material and/or the dimensions and/or the media in and around the resonator achieve a resonant frequency upon excitation, and wherein the resonator comprises, at least in the region of each waveguide, a recess in order to form an intermediate space between the waveguide and the resonator, via which space the coupling of light between the waveguides and the resonator is achieved.

Advantageously, the microtube is composed of oxides such as $SiO_2$, $SiO$, $TiO_2$, $Al_2O_3$, $HfO_2$, $Y_2O_3$, $ZrO_2$, of semiconductors such as Si, or of III-V and II-VI compound semiconductors such as GaAs, InGaAs, AlInGaAs, AlGaAs, or of combinations thereof.

Likewise advantageously, the waveguides are optical waveguides with wavelengths in the IR range, in the range of visible light, and/or in the UV range.

Also advantageously, the substrate or substrates is/are composed of silicon (Si), glass, silicon nitride, silicon on insulator material (SOI), plastics or semiconductors such as GaAs.

And also advantageously, the waveguides are composed of silicon (Si), glass, silicon nitride, silicon on insulator material (SOI), plastics or semiconductors such as GaAs.

It is also advantageous if the resonator is a rolled-up microtube.

It is likewise advantageous if the microtubes comprise at their ends respective regions which have a larger total diameter than in the regions of the tube in the region of the waveguide(s), and if the regions with the larger total diameter achieve the materially-bonded contact with the substrate(s).

It is furthermore advantageous if the recess in the microtube has in the region of the waveguide(s) a smaller dimension to the waveguide and/or partially has a concave, curved, jagged or undulated shape.

And it is also advantageous if the dimensions of the intermediate space between the waveguide and the resonator are less than half of the diameter of the microtube.

It is also advantageous if the intermediate space between the waveguide and the resonator and/or the interior space of the microtube is filled with air and/or a liquid.

In the method according the embodiments of the present disclosure for the production of a waveguide resonator component, at least two waveguides are positioned on at least one substrate, or at least one waveguide each is positioned on at least two substrates; at least one first layer is subsequently applied as a sacrificial layer to a substrate with one or multiple waveguides, and at least one second layer is applied thereto; the sacrificial layer is then at least partially removed; and by the rolling-up of the at least second layer, the resonator produced is, in the shape of a microtube, brought into materially-bonded contact with the at least second substrate in the case of multiple substrates.

Advantageously, photoresists or a layer of germanium are applied as a sacrificial layer.

Also advantageously, a layer of $SiO_2$, $SiO$, $TiO_2$, $Al_2O_3$, $HfO_2$, $Y_2O_3$, $ZrO_2$, of semiconductors such as Si, or of III-V and II-VI compound semiconductors such as GaAs, InGaAs, AlInGaAs, AlGaAs, or of combinations thereof, is applied as an at least second layer.

Likewise advantageously, the sacrificial layer is structured.

And also advantageously, the sacrificial layer is partially removed by etching.

It is also advantageous if the second and/or all other layers are structured.

And it is also advantageous if the second and all other layers are applied in a structured manner in the region of the waveguides to produce a recess in order to form an intermediate space between the waveguide and the rolled-up layer.

As a result of the embodiments of the present disclosure, it is possible for the first time to provide a wavelength resonator component that allows integrated production with a vertical resonator geometry and in which the coupling of the resonator to waveguides can be suitably controlled, as well as to specify a method with which these waveguide resonator components can be produced in a simple and cost-effective manner.

This is achieved by a waveguide resonator component which comprises either one substrate with at least two waveguides or at least two substrates with at least one waveguide each. For this purpose, a resonator is arranged which, according to embodiments of the present disclosure, has the shape of a microtube. The tube is thereby connected, directly or via one or multiple layers, in an only partially materially-bonded manner to the substrate(s). If at least two substrates are present, the tube is located between the substrates. The resonant frequency of the resonator during excitation is defined through the material and/or the dimensions and/or the media in and around the resonator. Therefore, the material and/or the dimensions and/or the media in and around the resonator are determined depending on the desired signal change (filtering out of frequencies or adding of frequencies) prior to the production of the component, and the microtube must be manufactured accordingly. A subsequent modification of the resonant frequency is possible by changing the media in and around the resonator. The resonant frequency changes, for example, when a liquid or gas flows through the tube.

This function of the microtube in the waveguide resonator component according to embodiments of the present disclosure can be used as a sensor in order to detect materials in the medium of the microtube.

According to embodiments of the present disclosure, the tube comprises in the region of each waveguide one recess which results in the formation of an intermediate space between the waveguide and the resonator. This intermediate space can be freely selected with regard to its geometric shape, wherein the size of the space is determined by the dimensions of the microtube on the one hand and, on the other hand, in that the resonance coupling of the waveguide to the resonator is achieved in this manner. Care must be taken that the spatial distance between the waveguide and the resonator is not so great that a resonance coupling no longer occurs.

This can be advantageously achieved by the shape of the recess, which can be concave, curved, jagged or undulated, for example.

Likewise advantageously, the microtube is a rolled-up microtube.

According to the embodiments of the present disclosure, the waveguide resonator component is produced in that at least two waveguides are positioned on at least one substrate, or at least one waveguide each is positioned on at least two substrates.

A first layer is subsequently applied as a sacrificial layer to the one substrate with at least two waveguides or to one of the at least two substrates with at least one waveguide. Advantageously, this sacrificial layer is structured. The shape of the structuring in the region of the waveguides can already determine the shape of the recess.

At least one second layer is applied to the sacrificial layer and advantageously also partially to the substrate. Both the first and also the at least one second layer are thereby advantageously only applied in the region of the rolling-up of the layer. However, they can also be applied over the entire substrate or larger regions of the substrate, though in this case the first and the at least one second layer must be removed, at least around the regions of the rolling-up of the at least one second layer, prior to the rolling-up.

The at least one second or each additional layer can also be structured during the application or partial removal.

The thickness of the sacrificial layer, as well as the dimensions of the at least one second layer for the production of a recess thereby determine the dimensions of the recess of the tube over the waveguide(s).

Subsequently, or already before the application of the at least one second layer, the sacrificial layer, for example the non-exposed parts of a photoresist layer, is at least partially removed.

If the sacrificial layer is partially removed prior to the application of the at least one second layer, then it must be preserved at least in the region of the rolling-up.

In any case, the sacrificial layer must be at least partially preserved in the region next to and on the waveguide(s) until the application of the at least one second layer.

As a sacrificial layer, individual or multiple layers, also made of different materials, can be applied on top of or next to one another.

The at least one second layer can also comprise one or multiple layers and also be composed of different materials arranged on top of or next to one another.

After the application of the at least one second layer, the sacrificial layer is partially or completely removed. In a partial removal, the remaining sacrificial layer achieves the adhesion between the rolled-up microtube and the substrate. In the case of a complete removal of the sacrificial layer, the at least one second layer comprises a direct materially-bonded contact to the substrate during the application, so that after the complete removal of the sacrificial layer, the rolled-up microtube adheres to the substrate in a stationary manner in the desired position via the at least one second layer.

With this step, it is also possible to remove unnecessary regions of the at least one second layer (without any rolling-up).

As a result of the removal of the sacrificial layer, the at least one second layer rolls up independently and is then connected, directly or via the remaining parts of the sacrificial layer, to the substrate in a materially-bonded manner over or preferably next to the waveguides. If multiple substrates are to be present, a second substrate is, for example, brought into materially-bonded contact with the rolled-up layer across from the first substrate after the at least one second layer is rolled up.

The special advantage of the solution according to embodiments of the disclosure is the vertical geometry of the resonator, allowing light waves to be transported between different planes.

It is also particularly advantageous that, according to embodiments of the disclosure, a combination of an integrated production, a vertical resonator and a controllable coupling is achieved.

Embodiments of the present disclosure are directed to a waveguide resonator component comprising at least one lower substrate and at least one upper substrate, at least one waveguide structured and arranged on each of the at least one lower substrate and the at least one upper substrate, and at least one microtube structured and arranged as a resonator, wherein the microtube comprises, directly or via one or multiple layers, a partial materially-bonded contact with the at least one lower substrate and the at least one upper substrate. A material and/or dimensions and/or a media in and around the resonator achieve a resonant frequency upon excitation. The resonator comprises, at least in a region of each waveguide, a recess forming an intermediate space between the respective waveguide and the resonator, and via which intermediate space, a coupling of light between the respective waveguides and the resonator is achievable.

In embodiments, the microtube comprises one or more oxides, one or more semiconductors, and/or combinations thereof.

In further embodiments, the oxides comprise at least one of $SiO_2$, $SiO$, $TiO_2$, $Al_2O_3$, $HfO_2$, $Y_2O_3$, $ZrO_2$, or combinations thereof.

In additional embodiments, the one or more semiconductors comprise Si, or III-V and II-VI compound semiconductors, or combinations thereof.

In yet further embodiments, the III-V compound semiconductors comprise GaAs, InGaAs, AlInGaAs, or AlGaAs.

In embodiments, the waveguides are optical waveguides with wavelengths in the IR range, in the range of visible light, and/or in the UV range.

In further embodiments, the substrates comprise at least one of silicon (Si), glass, silicon nitride, silicon on insulator material (SOI), plastics or one or more semiconductors.

In additional embodiments, the one or more semiconductors comprise GaAs.

In yet further embodiments, the waveguides comprise silicon (Si), glass, silicon nitride, silicon on insulator material (SOI), plastics or one or more semiconductors.

In embodiments, the one or more semiconductors comprise GaAs.

In further embodiments, the microtube is structured and arranged as a rolled-up microtube.

In additional embodiments, the microtube comprises at its ends, respective regions having a larger total diameter than in regions of the tube in a region of the waveguides. The materially-bonded contact with the substrates is arranged at the respective regions having the larger total diameter.

In yet further embodiments, the resonator is structured and arranged such that the recess has in the region of the waveguides a smaller dimension from the resonator to the respective waveguide and/or partially has a concave, curved, jagged, or undulated shape.

In embodiments, the dimensions of the intermediate space between the waveguide and the resonator are less than half of the diameter of the microtube.

In further embodiments, the intermediate space between the waveguide and the resonator and/or the interior space of the microtube is filled with air and/or a liquid.

Embodiments of the present disclosure are directed to a method for the production of a waveguide resonator component having at least one lower substrate and at least one upper substrate, at least one waveguide structured and arranged on each of the at least one lower substrate and the at least one upper substrate, and the resonator as a rolled-up microtube structured and arranged between the at least one lower substrate and the at least one upper substrate. The method comprises applying at least one first layer as a sacrificial layer to the at least one lower substrate, applying at least one second layer to the at least one first layer, at least partially removing the sacrificial layer to cause the at least one second layer to roll-up and thereby form the resonator as the rolled-up microtube, and forming a materially-bonded contact between the at least one lower substrate and the microtube.

In embodiments, photoresists or a layer of germanium are applied as the sacrificial layer.

In further embodiments, the at least one second layer comprises $SiO_2$, $SiO$, $TiO_2$, $Al_2O_3$, $HfO_2$, $Y_2O_3$, $ZrO_2$, semiconductors, or III-V and II-VI compound semiconductors, or combinations thereof.

In additional embodiments, the semiconductor comprises Si.

In yet further embodiments, the compound semiconductors comprise GaAs, InGaAs, AlInGaAs, or AlGaAs.

In embodiments, the sacrificial layer is structured.

In further embodiments, the sacrificial layer is partially removed by etching.

In additional embodiments, the at least one second layer and/or all other layers are structured.

In yet further embodiments, the applying the at least one second layer to the at least one first layer comprises applying the second layer and all other layers in a structured manner in the region of the waveguides to produce a recess in order to form an intermediate space between the waveguide and the rolled-up microtube.

Embodiments of the present disclosure are directed to a waveguide resonator component comprising at least one substrate, at least two waveguides structured and arranged on the at least one substrate, and at least one microtube structured and arranged as a resonator, wherein the microtube comprises, directly or via one or multiple layers, a partial materially-bonded contact with the at least one substrate. A material and/or dimensions and/or a media in and around the resonator achieve a resonant frequency upon excitation. The resonator comprises, at least in a region of each waveguide, a recess forming an intermediate space between the waveguide and the resonator, and via which intermediate space, a coupling of light between the waveguides and the resonator is achievable.

Additional embodiments of the present disclosure are directed to a method for the production of a waveguide resonator component having at least one substrate, at least two waveguides structured and arranged on the at least one substrate, and a resonator as a rolled-up microtube structured and arranged on the at least one substrate. The method comprises applying at least one first layer as a sacrificial layer to the at least one substrate, applying at least one second layer to the at least one first layer, at least partially removing the sacrificial layer to cause the at least one second layer to roll-up and thereby form the resonator as a rolled-up microtube, and forming a materially-bonded contact between the at least one substrate and the microtube.

In further embodiments, the method further comprises connecting the at least one upper substrate to the at least one second layer directly or via remaining parts of the sacrificial layer in a materially-bonded manner.

BRIEF DESCRIPTION OF THE DRAWINGS

The embodiments of the present disclosure is explained below in greater detail with the aid of several exemplary embodiments. Wherein.

DETAILED DESCRIPTION OF EMBODIMENTS OF THE DISCLOSURE

Example 1

Figure 1:
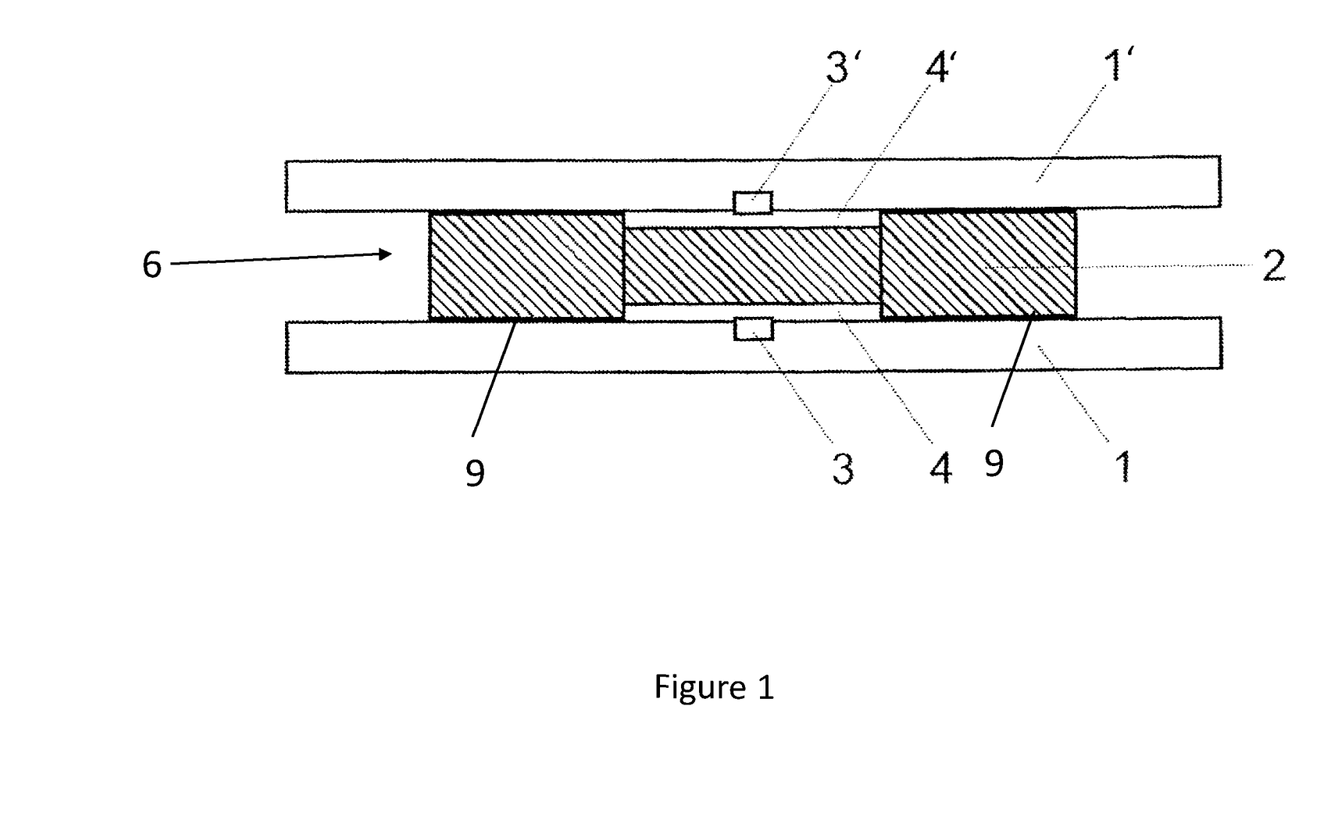
FIG. 1 shows a rolled-up waveguide resonator component according to the embodiments of the disclosure between two waveguide substrates in a side view.

As shown in FIG. 1, as substrates, two waveguide substrates 1, 1' with the dimensions 5 mm×5 mm are used. The substrates 1, 1' are respectively composed of two silicon layers separated by a silicon dioxide layer (silicon on insulator (SOI)). Using etching steps, waveguides 3, 3' of silicon with a width of 1 μm, a length of 5 mm, and a height of 250 nm are produced in a silicon layer of each substrate 1, 1'. One waveguide 3, 3' each is located at the center of a substrate 1, 1' and extends over the entire length of the substrate 1, 1'.

Figure 3:
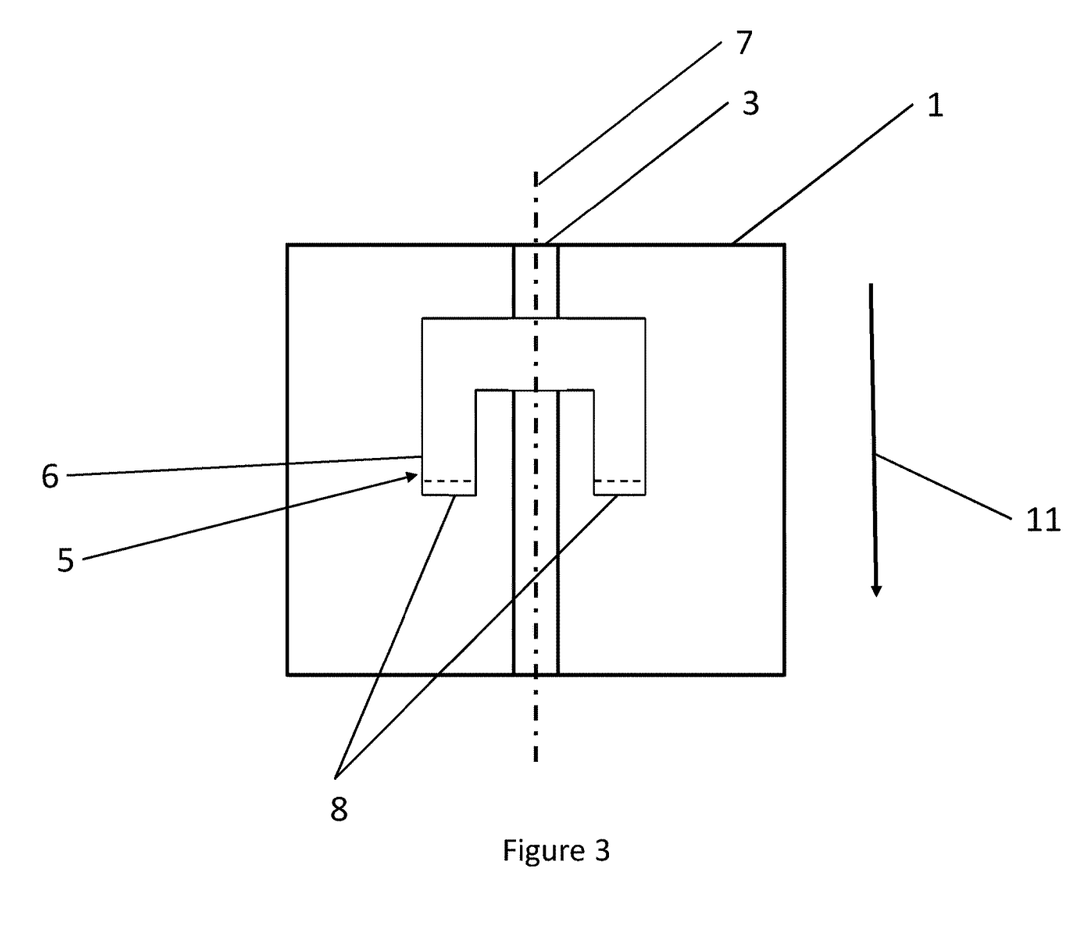
FIG. 3 shows an exemplary schematic top view of an intermediate structure of the waveguide resonator component of FIG. 1 on a waveguide substrate according to the embodiments of the disclosure.

A sacrificial layer of photoresist (AZ 701 MiR) with a thickness of 0.8 μm (not shown) is applied to one of these substrates 1 across the entire substrate surface. As depicted in FIG. 3, this photoresist layer is structured such that a U-shaped photoresist structure 5 with the outer dimensions 200 μm×200 μm is produced which is centrally arranged on the waveguide 3 along the axis of symmetry 7 of the photoresist structure 5. As a second layer 6, TiO$_2$ with a thickness of 90 nm is applied by electron beam evaporation, so that the U-shaped photoresist structure 5 is completely covered and so that at the two upper ends 8 of the U, the TiO$_2$ layer (or second layer 6) is applied to the substrate an additional 1 μm past the photoresist structure 5. The TiO$_2$ layer 6 is then rolled-up in a direction 11 parallel to the waveguide 3 by a complete disintegration (etching) of the sacrificial layer (or photoresist structure 5) to form a rolled up tube 2. The tube 2 then only comprises a materially-bonded contact to the substrate 1 at the two ends 9 of the tube 2.

The tube 2 now has the dimensions 200 μm×20 μm and comprises at the center a recess 4 with the dimensions 50 μm×90 nm.

This arrangement is subsequently connected to the second substrate 1', wherein the waveguides 3' of the second substrate 1' face downwards, run parallel to the waveguides 3 of the first substrate 1, and are also centrally aligned with the tube 2.

Example 2

Figure 2:
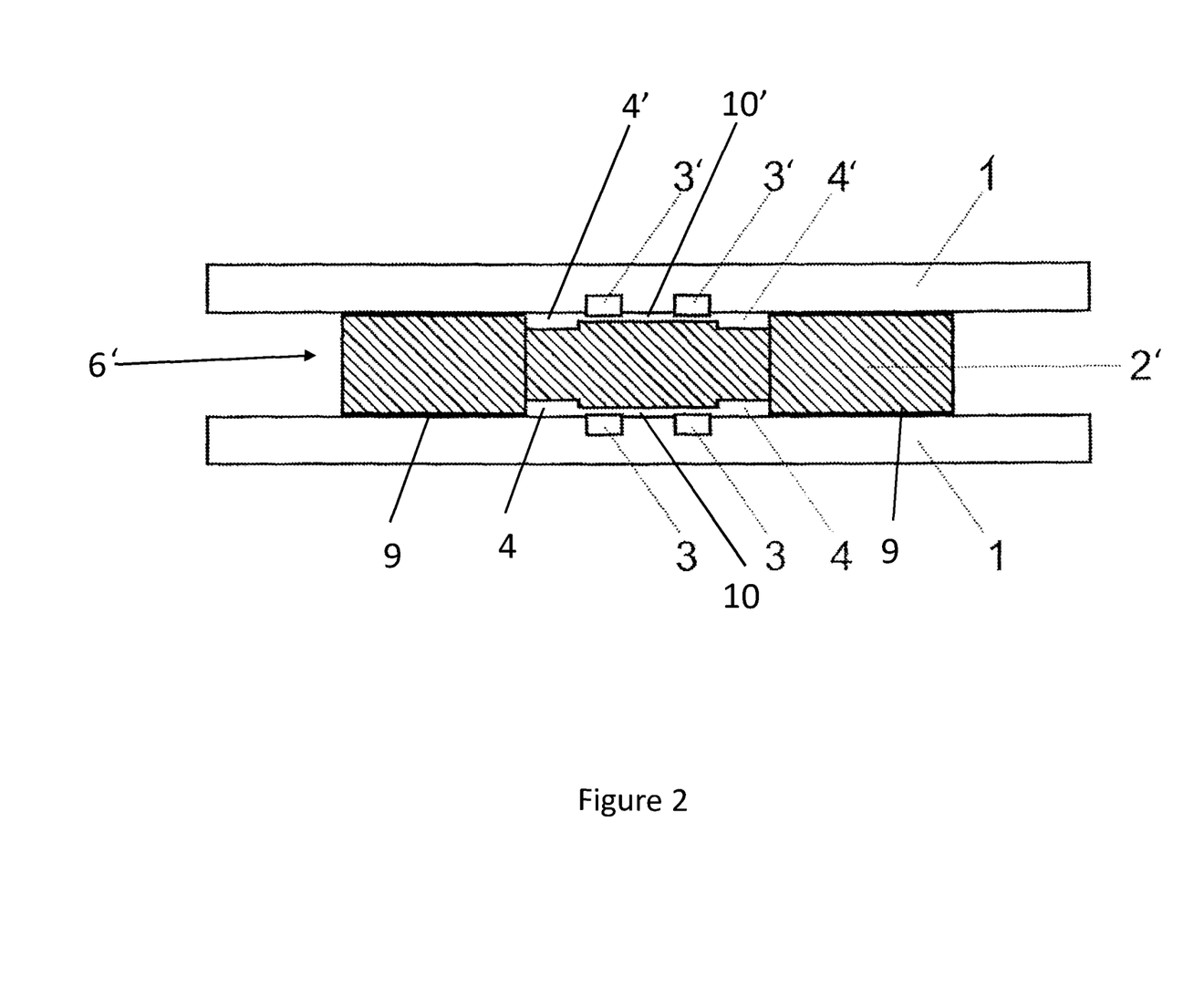
FIG. 2 shows a rolled-up waveguide resonator component according to the embodiments of the disclosure between two waveguide substrates with four waveguides in a side view (according to Example 2)

As shown in FIG. 2, two waveguides 3 of silicon arranged at a distance of 25 μm are produced next to one another on a substrate according to Example 1. That is, while the embodiment of Example 1 includes one waveguide on each substrate, the embodiment of FIG. 2, includes two waveguides on each substrate.

A photoresist layer and a TiO$_2$ layer are applied according to Example 1, wherein an E-shaped structure (not shown) is now in place of a U-shaped structure. The center bar of the E-shaped structure is embodied shorter and arranged over the two waveguides. As shown in FIG. 2, there is thus no materially-bonded contact of the subsequently rolled-up tube 2' with the waveguides 3 and the substrate 1. The structuring, removal and rolling-up of the layers occurs according to Example 1.

The microtube 2' obtained after the rolling-up has the dimensions 200 μm×20 μm and shows two recesses 4 with the dimensions 10 μm×180 nm outside the waveguides and one recess 10 with the dimensions 30 μm×90 nm (due to the shorter middle bar of the E-shaped structure) over the waveguides 3.

LIST OF REFERENCE NUMERALS 1, 1' Substrate
2, 2' Rolled-up microtube
3, 3' Waveguide
4, 4', 4", 4''' Recess
5 U-shaped photoresist structure
6, 6' Second layer
7 Axis of symmetry
8 Upper end of U-shaped structure
9 End of tube
10, 10' Center recess
11 Direction of rolling

The invention claimed is:

1. A waveguide resonator component comprising:
at least one lower substrate and at least one upper substrate;
at least one waveguide structured and arranged on each of the at least one lower substrate and the at least one upper substrate; and
at least one microtube structured and arranged as a resonator, wherein the microtube comprises, directly or via one or multiple layers, a partial materially-bonded contact with the at least one lower substrate and the at least one upper substrate,
wherein a material and/or dimensions and/or a media in and around the resonator achieve a resonant frequency upon excitation, and
wherein the resonator comprises, at least in a region of each waveguide, a recess forming an intermediate space between a respective waveguide and the resonator, and via which intermediate space, a coupling of light between the respective waveguides and the resonator is achievable,
wherein the microtube comprises one or more oxides,
wherein the oxides comprise at least one of $SiO_2$, $SiO$, $TiO_2$, $Al_2O_3$, $HfO_2$, $Y_2O_3$, $ZrO_2$, or combinations thereof.

2. The waveguide resonator component according to claim 1, wherein the waveguides are optical waveguides with wavelengths in the IR range, in the range of visible light, and/or in the UV range.

3. The waveguide resonator component according to claim 1, wherein the substrates comprise at least one of silicon (Si), glass, silicon nitride, silicon on insulator material (SOI), plastics, or one or more semiconductors.

4. The waveguide resonator component according to claim 1, wherein the waveguides comprise silicon (Si), glass, silicon nitride, silicon on insulator material (SOI), plastics or one or more semiconductors.

5. The waveguide resonator component according to claim 1, wherein the microtube is structured and arranged as a rolled-up microtube.

6. The waveguide resonator component according to claim 1, wherein the microtube comprises at its ends, respective regions having a larger total diameter than in regions of the tube in a region of the waveguides, and
wherein the materially-bonded contact with the substrates is arranged at the respective regions having the larger total diameter.

7. The waveguide resonator component according to claim 1, wherein the resonator is structured and arranged such that the recess has in the region of the waveguides a smaller dimension from the resonator to the respective waveguide than a distance from the resonator to a respective substrate of the at least one lower substrate and at least one upper substrate, and/or partially has a concave, curved, jagged, or undulated shape.

8. The waveguide resonator component according to claim 1, wherein the dimensions of the intermediate space between the waveguide and the resonator are less than half of the diameter of the microtube.

9. The waveguide resonator component according to claim 1, wherein the intermediate space between the waveguide and the resonator and/or the interior space of the microtube is filled with air and/or a liquid.

10. A waveguide resonator component comprising:
at least one lower substrate and at least one upper substrate;
at least one waveguide structured and arranged on each of the at least one lower substrate and the at least one upper substrate; and
at least one microtube structured and arranged as a resonator, wherein the microtube comprises, directly or via one or multiple layers, a partial materially-bonded contact with the at least one lower substrate and the at least one upper substrate,
wherein a material and/or dimensions and/or a media in and around the resonator achieve a resonant frequency upon excitation, and
wherein the resonator comprises, at least in a region of each waveguide, a recess forming an intermediate space between a respective waveguide and the resonator, and via which intermediate space, a coupling of light between the respective waveguides and the resonator is achievable,
wherein the microtube comprises one or more oxides, one or more semiconductors, or combinations thereof,
wherein the one or more semiconductors comprise Si or III-V and II-VI compound semiconductors, or combinations thereof.

11. The waveguide resonator component according to claim 10, wherein the III-V compound semiconductors comprise at least one of GaAs, InGaAs, AlInGaAs, or AlGaAs.

12. A waveguide resonator component comprising:
at least one lower substrate and at least one upper substrate;
at least one waveguide structured and arranged on each of the at least one lower substrate and the at least one upper substrate; and
at least one microtube structured and arranged as a resonator, wherein the microtube comprises, directly or via one or multiple layers, a partial materially-bonded contact with the at least one lower substrate and the at least one upper substrate,
wherein a material and/or dimensions and/or a media in and around the resonator achieve a resonant frequency upon excitation, and
wherein the resonator comprises, at least in a region of each waveguide, a recess forming an intermediate space between a respective waveguide and the resonator, and via which intermediate space, a coupling of light between the respective waveguides and the resonator is achievable,
wherein the substrates comprise one or more semiconductors, and
wherein the one or more semiconductors comprise GaAs.

13. A waveguide resonator component comprising:
at least one lower substrate and at least one upper substrate;

at least one waveguide structured and arranged on each of the at least one lower substrate and the at least one upper substrate; and at least one microtube structured and arranged as a resonator, wherein the microtube comprises, directly or via one or multiple layers, a partial materially-bonded contact with the at least one lower substrate and the at least one upper substrate, wherein a material and/or dimensions and/or a media in and around the resonator achieve a resonant frequency upon excitation, and wherein the resonator comprises, at least in a region of each waveguide, a recess forming an intermediate space between a respective waveguide and the resonator, and via which intermediate space, a coupling of light between the respective waveguides and the resonator is achievable, wherein the waveguides comprise silicon nitride or one or more semiconductors, and wherein the one or more semiconductors comprise GaAs.

14. A waveguide resonator component comprising:

at least one substrate;

at least two waveguides structured and arranged on the at least one substrate; and at least one microtube structured and arranged as a resonator, wherein the microtube comprises, directly or via one or multiple layers, a partial materially-bonded contact with the at least one substrate, wherein a material and/or dimensions and/or a media in and around the resonator achieve a resonant frequency upon excitation, and wherein the resonator comprises, at least in a region of each waveguide, a recess forming an intermediate space between the waveguide and the resonator, and via which intermediate space, a coupling of light between the waveguides and the resonator is achievable wherein the at least one microtube comprises one or more oxides, wherein the oxides comprise at least one of $SiO_2$, SiO, $TiO_2$, $Al_2O_3$, $HfO_2$, $Y_2O_3$, $ZrO_2$, or combinations thereof.

15. A waveguide resonator component comprising:

a substrate/waveguide structure comprising either:
 a lower substrate, an upper substrate, and one waveguide structured and arranged on both the lower substrate and the upper substrate; or
 a single substrate, and two waveguides structured and arranged on the single substrate; and at least one microtube structured and arranged as a resonator, wherein the microtube comprises, directly or via one or multiple layers, a partial materially-bonded contact with either the lower substrate and the upper substrate, or the single substrate;

wherein a material and/or dimensions and/or a media in and around the resonator achieve a resonant frequency upon excitation, and wherein the resonator comprises, at least in a region of each waveguide, a recess forming an intermediate space between a respective waveguide and the resonator, and via which intermediate space, a coupling of light between the respective waveguide and the resonator is achievable, wherein the microtube comprises one or more oxides, one or more semiconductors, or combinations thereof, wherein the one or more semiconductors comprise Si, or III-V and II-VI compound semiconductors, or combinations thereof, and wherein the III-V compound semiconductors comprise at least one of AlInGaAs and AlGaAs.

* * * * *